May 13, 1969
L. H. EDWARDS
3,443,645
ROTARY ROD WEEDER DRIVE
Filed Nov. 3, 1966
Sheet 1 of 2
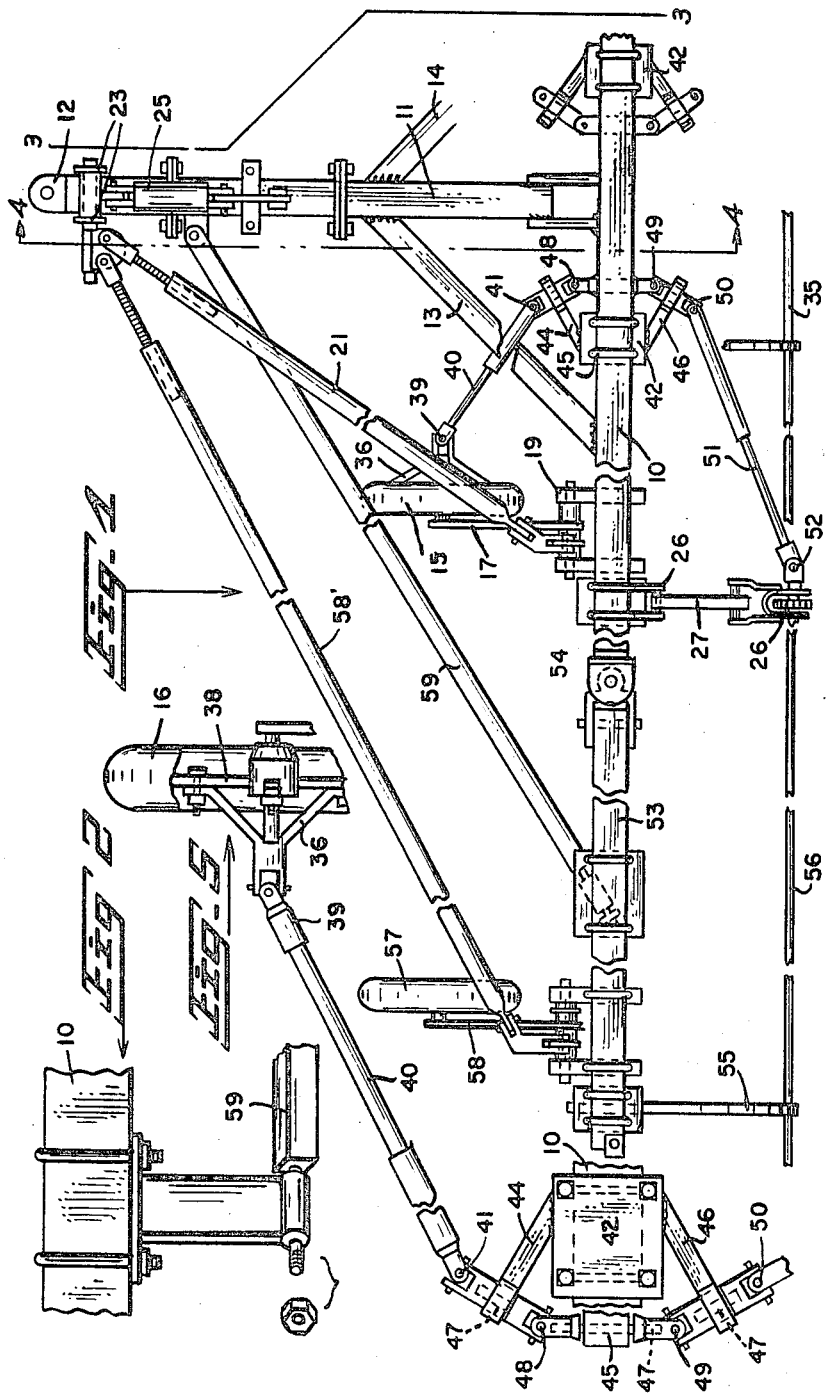
INVENTOR
Lawrence H. Edwards
by
*Walter L. Boggus*
Agent

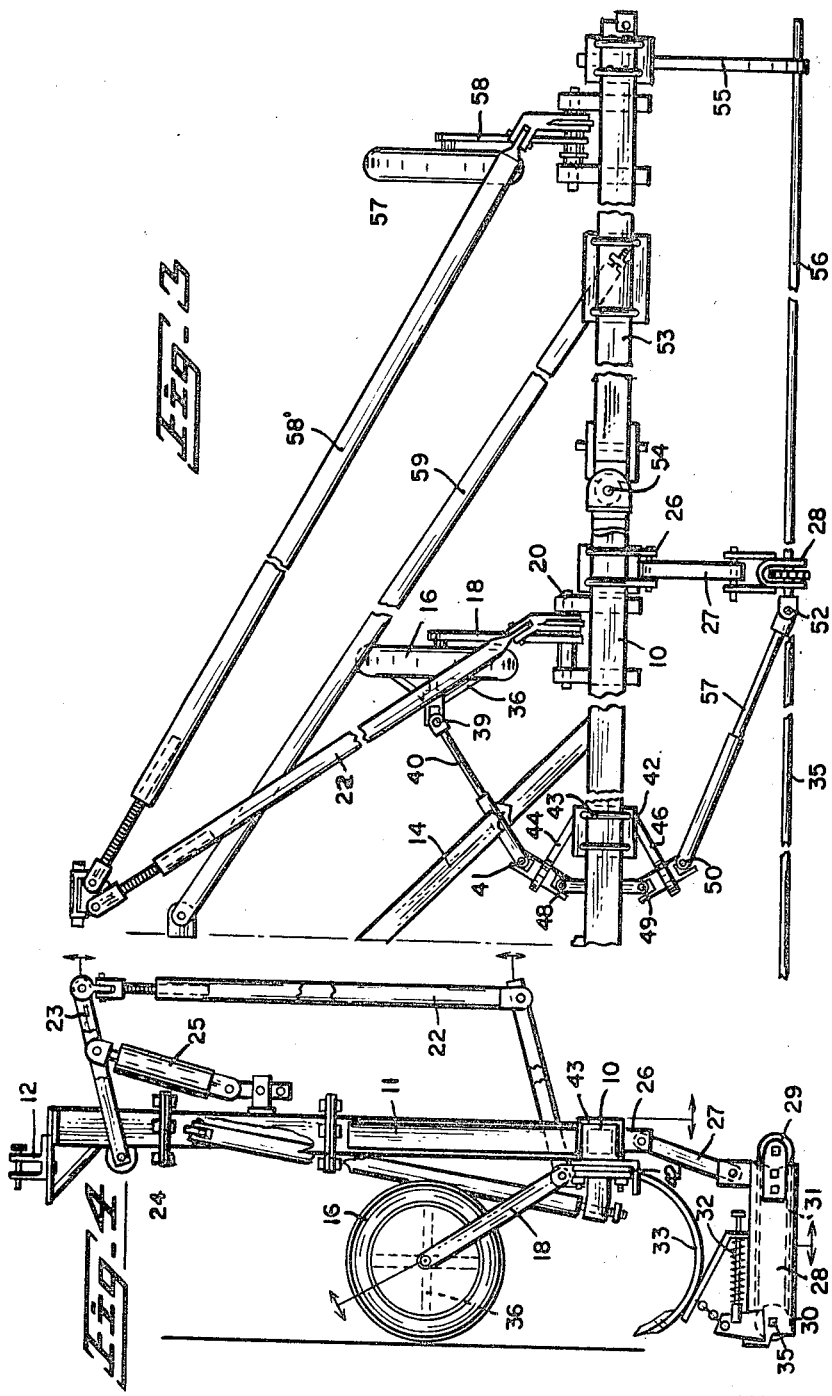

United States Patent Office 3,443,645
Patented May 13, 1969

3,443,645
ROTARY ROD WEEDER DRIVE
Lawrence H. Edwards, P.O. Box 995,
Lethbridge, Alberta, Canada
Filed Nov. 3, 1966, Ser. No. 591,829
Int. Cl. A01b *39/19;* F16d *3/02, 3/72*
U.S. Cl. 172—44                                          1 Claim

ABSTRACT OF THE DISCLOSURE

A rotary rod weeder drive, wherein a wheel supported frame carries the working weeder rod which passes through the lower end of a frame-supported standard; a rotor linkage is formed from universals which connect spaced stub axles, each axle being rotatable in one of a semi-circular series of bearings which are carried by a plate; said plate adjustably secured to the frame for positions therealong; one end of said linkage driven by a ground wheel of the weeder and the other end passing into the upper end of the standard to drive said weeder rod through an endless belt therein.

This invention relates to weeding machines commonly known as rotary rod weeders, wherein a driven rotary rod moves through and under the surface of the ground as the machine moves thereover, for extraction of weeds therefrom in quantity so they can be left on the ground surface for sun extermination. At the same time, the ground is thoroughly broken up and pulverized for the cultivation of crops.

The above mentioned weeding is best accomplished when the weeder rod is driven in the opposite direction to the rotation of the ground wheels of the machine. Accordingly, a drive from one of these wheels is usually through a reverse gearing or a complicated chain drive, including jack shafts, which are expensive constructions and give a lot of trouble under dusty or stony conditions.

The principal object of the present invention is: to provide a direct drive from one or both of the machine ground wheels to the rotary rod weed mechanism without using such reversing constructions.

A further object of the invention is: to construct the said drive mechanism in a relatively simple and positive manner while obtaining a steady reversing torque on the driven weeding rod.

A further object of the invention is: to provide the drive well above the working parts of the machine so as to clear flying stones and other damaging material thereto.

A still further object of the invention is: to mount the mechanism support on the frame so it can be easily adjusted therealong for the most satisfactory working position.

With the above important and other minor objects in view, which will become more apparent as this disclosure proceeds, the invention consists essentially in the construction and arrangement of the various parts hereinafter more particularly described, reference being had to the accompanying drawings wherein:

FIGURE 1 is a plan view of one end of a rotary rod weeding machine and showing an installed drive.

FIGURE 2 is a perspective view of the released fastening for one end of a frame reinforcement.

FIGURE 3 is a plan view of the opposite end of the rod weeding machine, taken from the line 3—3 of FIGURE 1 and showing a further installed drive.

FIGURE 4 is a vertical cross section of the machine taken on the line 4—4 of FIGURE 1.

FIGURE 5 is an enlarged inverted partial plan of the new drive.

In the drawings like characters of reference indicate corresponding parts in the several figures.

A central square tubing 10 forms the main frame of the machine. This frame is centrally provided with a forward extending beam 11 which provides a tongue for the frame, the front end presenting a draft hitch 12 for connection with a tractor (not shown). Angular braces 13 and 14 connect the tongue and the frame for rigidity. A pair of ground wheels 15 and 16 support the frame, one on each side of the tongue, and through a pair of bell cranks 17 and 18 which are pivoted on frame brackets 19 and 20. The upper ends of the bell cranks are connected through the adjustable links 21 and 22 with a pair of parallel synchronized arms 23, the lower ends of which are pivoted on brackets 24 carried below the tongue. A ram 25 has one end pivoted on the tongue and the other end pivotally connected between the arms 23, so the frame 10 can be power raised or lowered on the wheels by the ram.

A pair of brackets 26 are mounted on the frame 10, one at each end thereof. These brackets are each connected by links 27 with vertical standards 28, one for each bracket link. A sprocket 29 is rotatably mounted at the top of each standard, and a further sprocket 30 is rotatably mounted at the bottom thereof, so the two can be connected by an endless chain or belt 31 inside the standard. The bottom of the standard is resiliently connected at 32 to the rear part of a cultivator shank 33 operably carried by the under part of the frame 10. A short piece of chain 34 also connects the bottom of the standard with the shank for draft purposes. Weeder rods 35 are rotatably mounted through the lower ends of the standards, including the sprockets 30 which drive same when the chain or belt 31 is operated. A drive to this weeder rod mechanism, which constitutes the principal part of this invention, will now be described.

As indicated in dotted outline in FIGURE 4 and shown in FIGURE 5, a four-pronged spider 36 is bolted to the spokes or disk 38 of the ground wheels 15 and 16. This spider, through a universal joint 39, drives a shaft 40 having a further universal joint 41 at its opposite end. A plate 42, carried by the frame 10, is secured thereto by U-bolts 43. This plate is provided with three outwardly projecting arms 44, 45 and 46 which have bearings at their extremities for the rotation of stub shafts 47 therein. The universal 41 connects with the first stub shaft and further universals 48 and 49 connect the others, between the bearings, so that a curved rotatable linkage is formed thereby. Another universal 50 connects the last stub shaft of this linkage with an extension shaft 51 having a further universal 52 at the opposite end which is attached to the sprocket 29 of the standard 28.

From the above it will be seen that when the ground wheels 15 and 16 are travelling, the spiders 37 thereon will directly drive the sprockets 29 through the above linkage, and the chains 31 will drive the weeder shaft 35 in the opposite direction to that of the ground wheels. When the ram 25 lowers the frame 10 on the wheels, the cultivator shanks will enter the ground to plow same, while the standards and the rotating weeder rods will also enter the ground to follow up and pulverize same, including the rooting-out of noxious weeds for sun extermination.

By adjustably mounting the plates 42 on the main frame, the U-bolts can be withdrawn for removal of the linkage from the machine, and when the drive is being installed, the adjustment along the frame will permit the various working parts of the linkage to accommodate themselves for free running positions and so insure long satisfactory operation.

It will also be observed in FIGURES 1 and 3 that extensions 53 are connected to the ends of the frame 10 through pivots 54, and they are provided with extra cultivator shanks 55 and weeder rods 56 for wider ground coverage. These extensions are also supported by ground wheels 57 on which the extensions can be raised and lowered in the same manner and at the same time as the main frame 10, through bell cranks 58 and links 58' to the ram arms 23. Reinforcing bars 59 connect the extensions to the tongue for rigidity and true alignment with the main frame. The shanks 55 similarly support and pull the weeder rods 56 through the ground. These latter weed rods are telescope-connected (not shown) to the main rods 35 so they can be driven thereby. This telescoping also permits the rods 56 to slide therefrom when the extensions are swung ahead on their connecting pivots 54 to pass through gateways, the bars 59 being disconnected therefrom in the manner shown in FIGURE 2 for the purpose while the bars 58 can be bolt released.

From the above disclosure it will be seen that I have provided direct linkage drives from the main frame ground wheels to the weeder rod standards and the linkage thereof can pass under or over the main frame to clear flying stones and other debris while the weeder rods will be positively driven in continuous rotation through the ground as the machine passes thereover, and in reverse direction to that of the ground wheels. In actual use this drive has been found very efficient and reliable and completely eliminates the former troubles associated with reverse gearing and chain drives.

What I claim as my invention is:

1. In a rotary rod weeding machine having a wheel-supported beam frame and a rod mounted lengthwise of the frame for rotation in the ground as the machine moves thereover; a drive mechanism for said rod, comprising: a standard mounted on the machine and through which said rod passes; endless belt means mounted on said standard and rotatably connected with the rod; a curved series of bearings mounted on the beam frame and each bearing rotatably receiving a stub shaft; universals connecting the stub shafts between said bearings to form a curved rotatable linkage; a shaft connecting one end of said linkage with one of the frame supporting wheels for rotation of the linkage by said wheel; a second shaft operably connecting the opposite end of the linkage with said endless belt means for rotation of the weeder rod by said linkage; the curvature of the linkage being provided by a plate having a series of radiating arms which terminate in said bearings; and said plate secured to the beam frame by U-bolts for adjustable positions of the plate along the beam frame.

References Cited

UNITED STATES PATENTS

| 2,030,511 | 2/1936 | Gruber | 64—2.6 |
| 2,093,070 | 9/1937 | Bloom et al. | 172—44 |
| 2,556,416 | 6/1951 | Clausen | 172—44 |
| 2,739,517 | 3/1956 | Roberts | 172—117 X |
| 2,880,689 | 4/1959 | Bokowski. | |
| 3,033,294 | 5/1962 | Edwards | 172—44 |
| 3,115,940 | 12/1963 | Heinrich | 172—44 |

ABRAHAM G. STONE, Primary Examiner.

A. E. KOPECKI, Assistant Examiner.

U.S. Cl. X.R.

64—6